April 19, 1960 W. B. FAHRENBACH ET AL 2,932,929
TRAY PACKING AND FORMING MACHINE
Filed Jan. 8, 1959 7 Sheets-Sheet 1
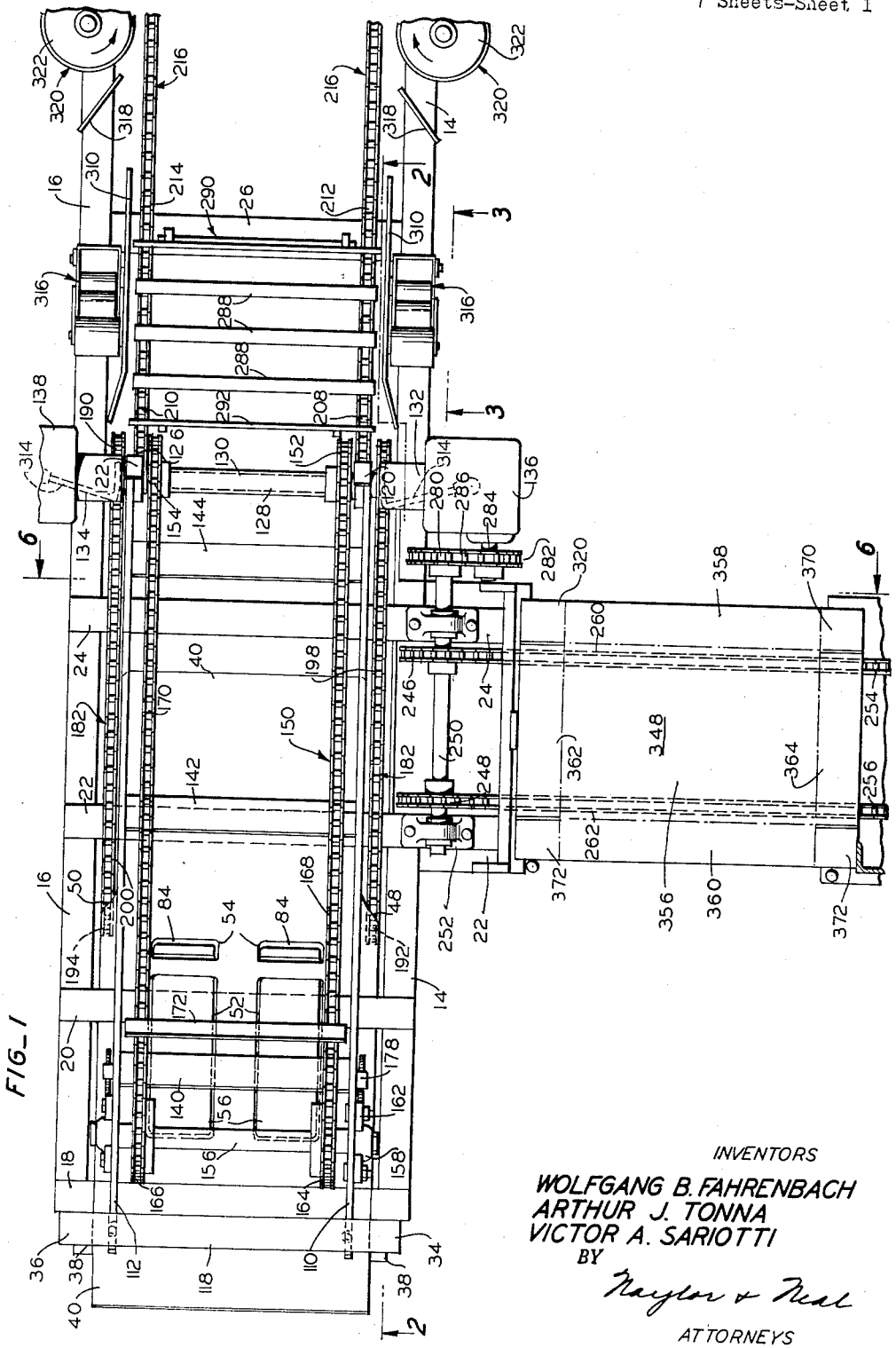
FIG_1
INVENTORS
WOLFGANG B. FAHRENBACH
ARTHUR J. TONNA
VICTOR A. SARIOTTI
BY
Naylor & Neal
ATTORNEYS

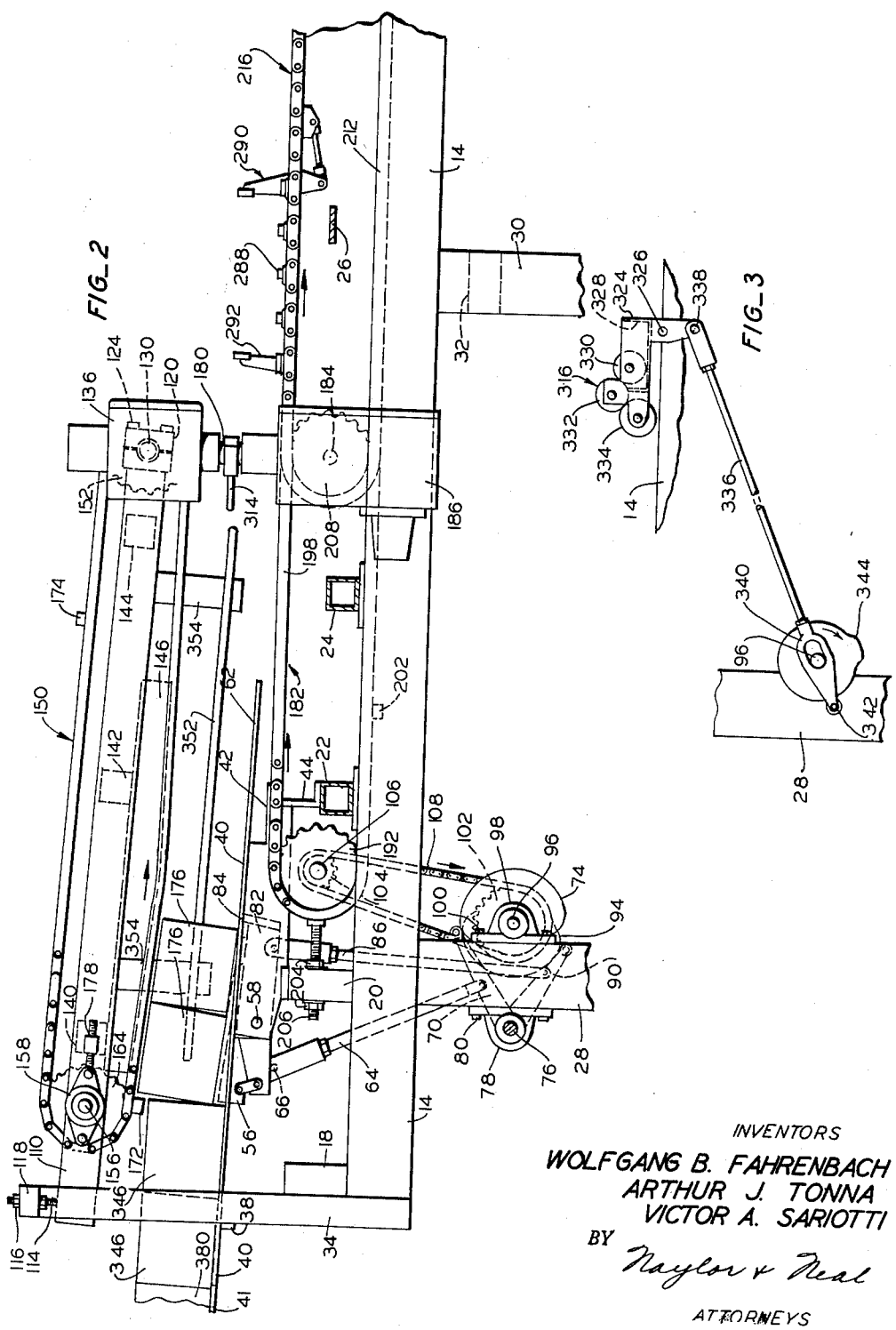

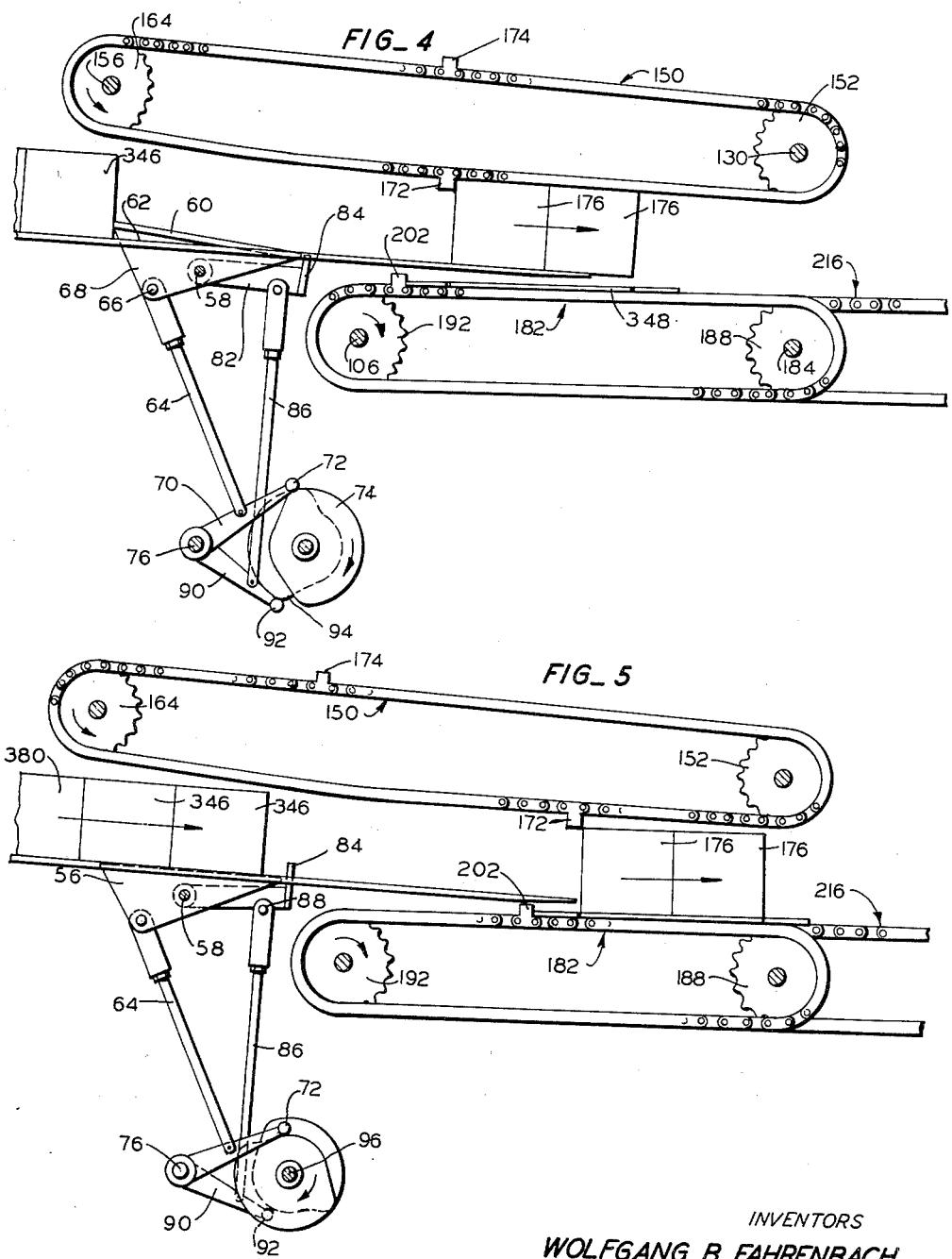

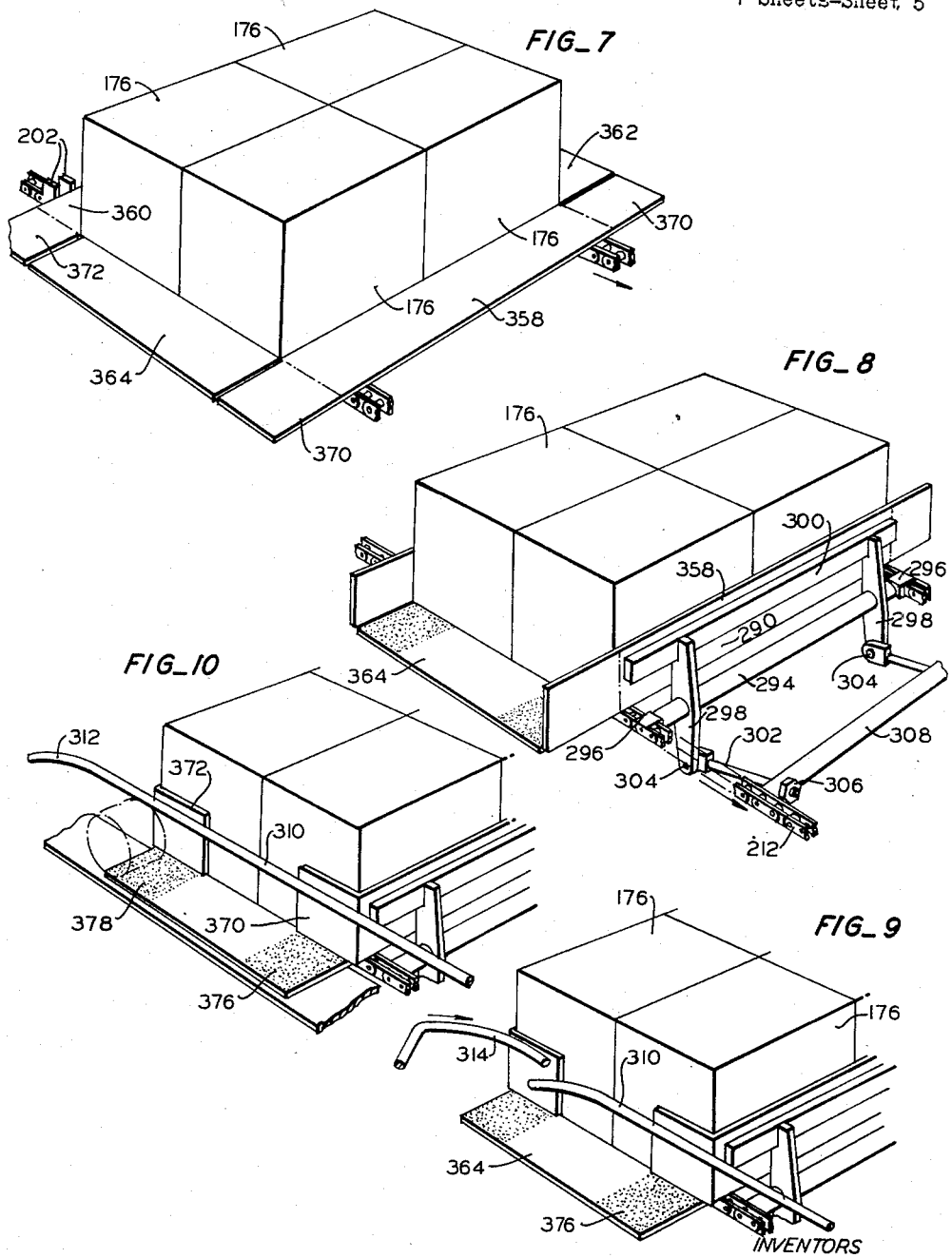

April 19, 1960 W. B. FAHRENBACH ET AL 2,932,929
TRAY PACKING AND FORMING MACHINE
Filed Jan. 8, 1959 7 Sheets-Sheet 6
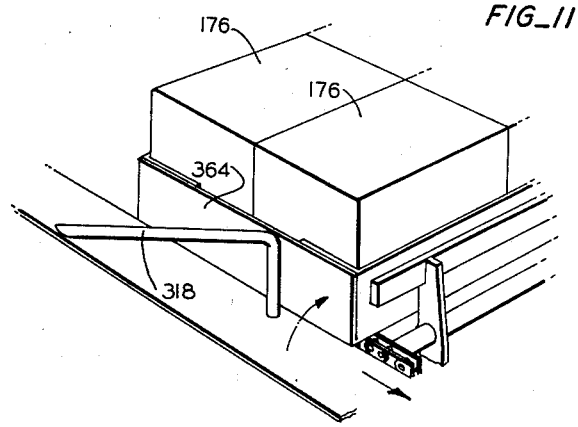
FIG_11
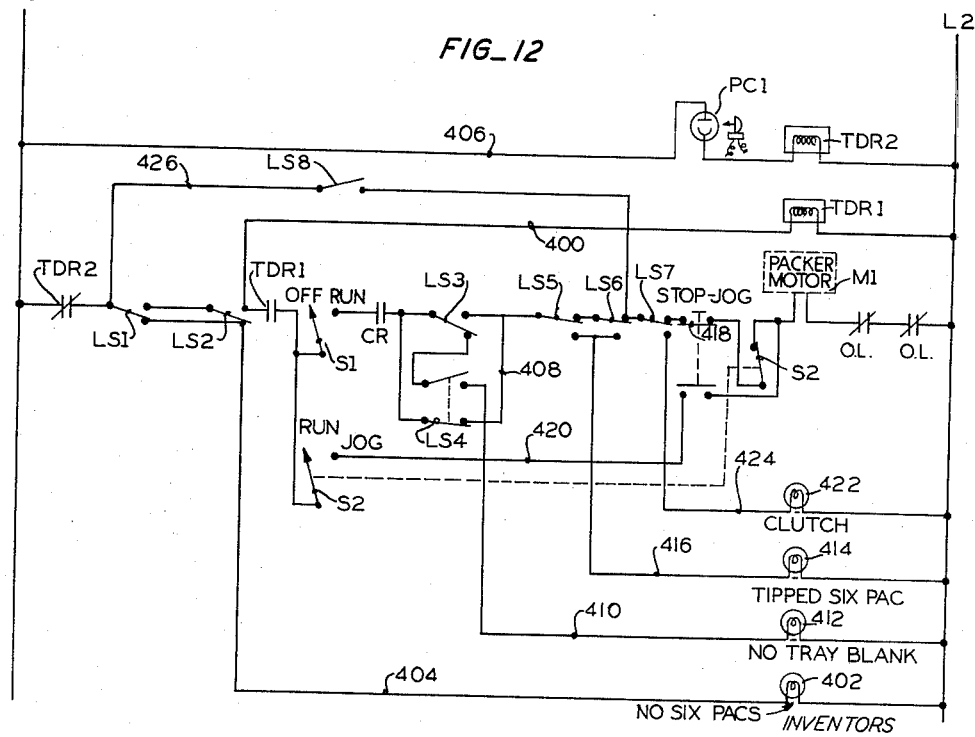
FIG_12
INVENTORS
WOLFGANG B. FAHRENBACH
ARTHUR J. TONNA
VICTOR A. SARIOTTI
BY Naylor & Neal
ATTORNEYS FIG_13
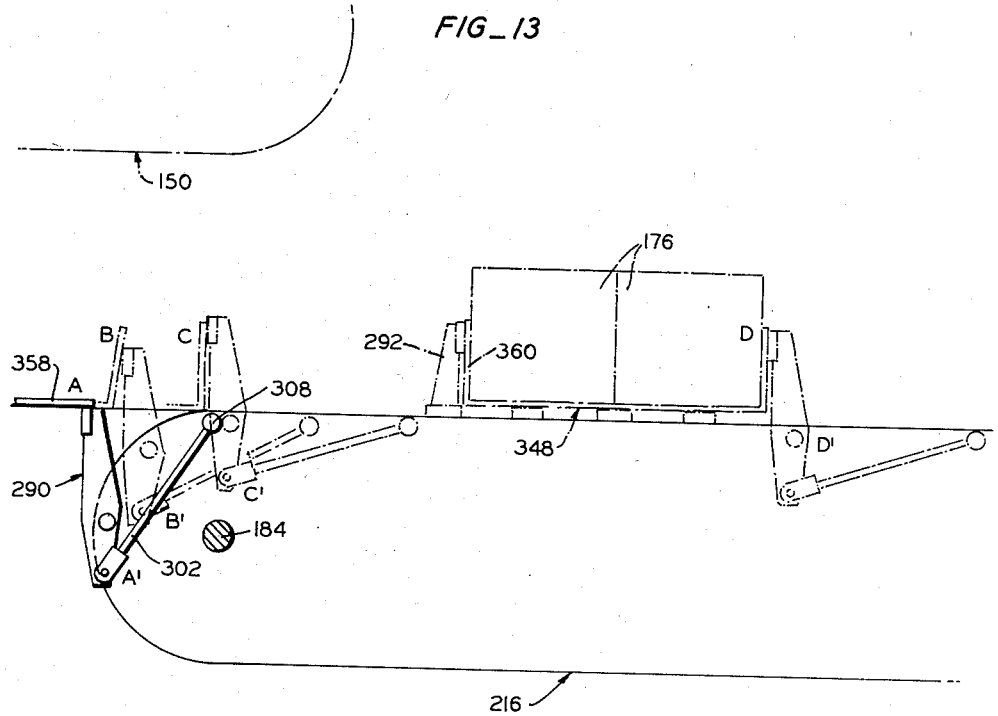
FIG_14
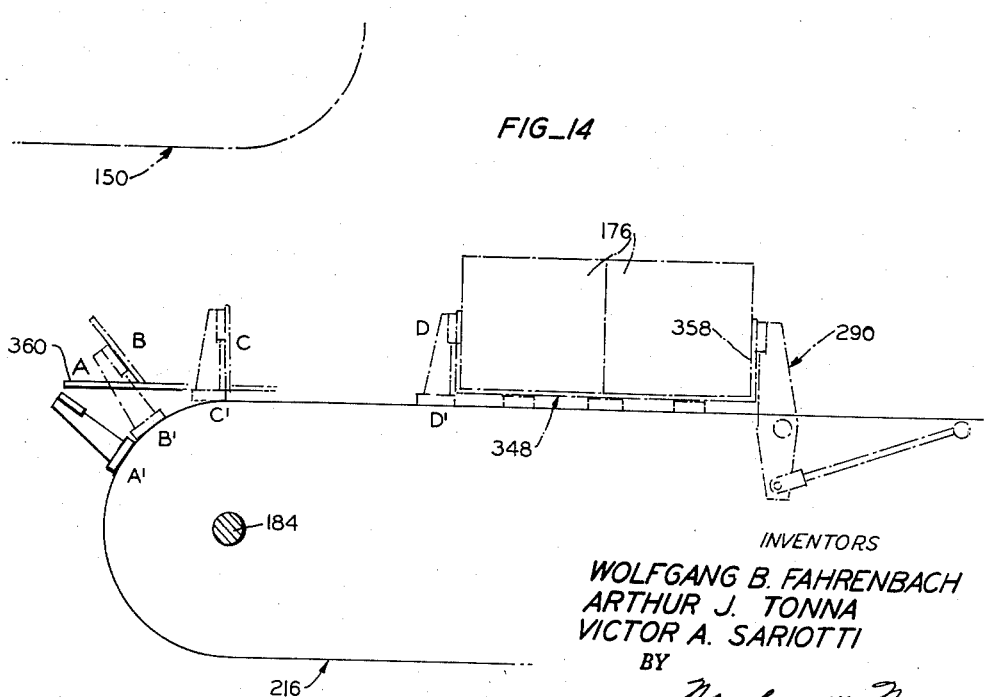
INVENTORS
WOLFGANG B. FAHRENBACH
ARTHUR J. TONNA
VICTOR A. SARIOTTI
BY
Naylor & Neal
ATTORNEYS

United States Patent Office 2,932,929
Patented Apr. 19, 1960

2,932,929

TRAY PACKING AND FORMING MACHINE

Wolfgang B. Fahrenbach, Oakland, Arthur J. Tonna, San Francisco, and Victor A. Sariotti, Daly City, Calif., assignors to Burgermeister Brewing Corporation, San Francisco, Calif., a corporation of California Application January 8, 1959, Serial No. 785,692

21 Claims. (Cl. 53—159)

This invention relates generally to packing machines and more particularly, to a machine for the packing of articles in trays formed from blanks while the articles are positioned thereon.

In the brewing industry it is common practice to pack filled cans of beer for retail sale in cartons of six, known as "six packs," a plurality of which are in turn packed in corrugated board trays for handling during shipment. The trays used in the packaging of such six packs are the same ones used by the can manufacturers in the initial delivery of the empty cans to the brewery for filling. Before the trays can be used for packaging, it is therefore necessary to remove the empty cans, thereafter rerouting the emptied trays to the packing line for filling with the loaded six packs. Such procedure is disadvantageous in that it requires considerable tray handling as well as additional space for the storage of the made-up trays prior to their loading. It is therefore an object of this invention to provide a machine for the production line traying of six pack cartons of beer which will eliminate the above disadvantages of the present system by utilizing substantially flat tray blanks, automatically formed into trays about the six pack cartons.

It is a further object of this invention to provide a machine of the character described, having general applicability to the packaging of articles in trays singly, or in multiples.

Another object of this invention is the provision of a machine, as above described, capable of continuous high speed production line operation with a minimum of necessary attendant labor and supervision.

Yet another object of the invention is to provide a tray forming and packing machine, the elements of which are at all times positively synchronized in operation, permitting of centralized control and driving from a single power source.

Other objects and advantages of this invention will become apparent from the following description when taken in conjunction with the drawings in which:

Figure 1 is a view in plan of the invention showing the tray blank feed means laterally displaced to one side of the path of travel of the six pack cartons.

Figure 2 is a view in side elevation of the invention taken on the line 2—2 of Figure 1.

Figure 3 is a view in side elevation taken on line 3—3 of Figure 1, showing a typical glue applicator used for applying glue to the upper surface portions of a side panel of the tray blank.

Figures 4 and 5 are simplified views in section, respectively showing delivery and deposition of six pack cartons of beer upon an underlying substantially flat tray blank.

Figures 7–11 are simplified views in perspective illustrating the forming and gluing of a loaded tray.

Figure 12 is an across-the-line wiring diagram of the control system circuitry utilized in conjunction with the invention.

Figures 13 and 14 are simplified views in section, respectively showing in phantom the steps involved in upfolding the tray front and rear panels into vertical positions.

Figure 6:
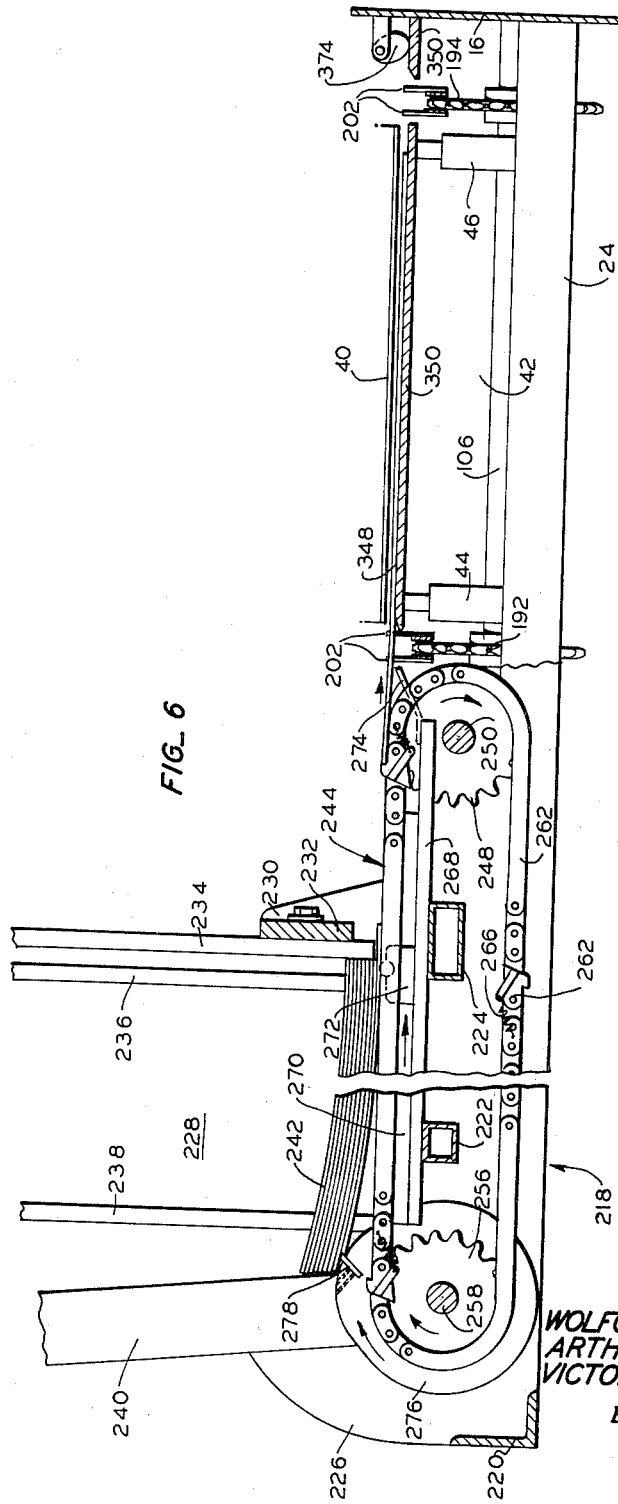
Figure 6 is a view in side elevation taken on line 6—6 of Figure 1 illustrating the tray blank feed means.

Referring now to Figures 1 and 2, the supporting framework for the machine is shown as comprising a pair of parallel spaced apart longitudinal side members 14 and 16, a plurality of cross members 18, 20, 22, 24 and 26, tying the side members 14 and 16 together, and legs 28 and 30 secured to and depending from side members 14 and 16, legs 30 being connected by a cross member 32. Secured to the ends of members 14 and 16 are uprights 34 and 36 tied together by cross member 38, to which latter is fixedly secured the upper or rearward end of an inclined skid plate 40 upon which are disposed six pack cartons of canned beer fed thereto in two lines from a conveyor 41. Although the embodiment is illustrated as handling six pack cartons of beer, for which it is particularly well adapted, the machine of this invention is equally well suited for handling a wide variety of goods of generally rectangular shape for packing in trays singly or in multiples. Supporting skid plate 40 and fixedly secured thereto at its forward end is a member 42 secured to angle members 44 and 46 carried atop cross member 22. The skid plate 40 comprises a rearward portion, which extends substantially the entire distance between uprights 34 and 36, and a forward portion reduced in width by an inward taper or cutaway of the sides at 48 and 50. The rearward portion of skid plate 40 is provided with a first pair of apertures 52, of generally rectangular shape symmetrically disposed astraddle the skid plate longitudinal axis, and a second pair of apertures 54, forwardly of said first pair of apertures, also of generally rectangular shape and similarly disposed astraddle the longitudinal axis of the skid plate.

Rocker plates 56 of generally rectangular shape are disposed in each of the apertures 52 being pivotally secured to member 42 through pins 58 and positioned to permit the pivoting of their upper surfaces 60 into the plane of the upper surface 62 of skid plate 40 and out of the plane thereof by elevating the rearward portion of the skid plate, as indicated in Figure 2. Inasmuch as the rocker plates 56 and the means for effecting their pivotal movement are similar, a description of one such pivoting means will suffice for both. The means for pivotal actuation of each plate 56 includes a pitman 64 connected at its upper end, as by pin 66, to member 68, integral with and depending from plate 56. At its lower end, pitman 64 is pin connected centrally of lever arm 70, which latter carries at one end a roller 72 adapted to engage a cam 74 and at the other end pivots about shaft 76 journaled at either end in flanged bushings 78 secured, as by studs 80, to legs 28.

Stop members 82 are pivoted to member 42 through pins 58 for the projecting of their respective carton engaging toe flanges 84 through apertures 54, as shown in Figure 5. As in the case of the rocker plates 58, the respective stop members 82 and their actuating means are similar, and accordingly only one such means will be described. Pivotal actuation of each stop member 82 is accomplished through means including a pitman 86 pivotally connected at its upper end to member 82, as by a pin 88, and at its lower end pivotally connected to lever arm 90, which arm at one end carries a roller 92 adapted to engage cam 94 and at the other end is pivoted about shaft 76.

Cams 74 and 94 are fixedly secured in side by side relationship to shaft 96 journaled at either end in bushings 98, secured as by studs 100, to legs 28. Shaft 96 and cams 74 and 94 are driven in rotation by means of sprocket 102 fixedly secured to shaft 96, drive sprocket 104 fixedly secured to shaft 106, and endless chain 108 entrained about sprockets 102 and 104.

Positioned at the upper end of the machine are a pair of parallel spaced apart support rails 110 and 112 which are suspended at their rearward ends, as by hanger rods 114 and adjusting nuts 116 threaded thereon, from a cross member 118 secured atop, and extending between, uprights 34 and 36. Said support rails incline downwardly toward their forward ends, having secured thereat split collars 120 and 122 which are secured, as by bolts 124 and 126, to sleeve 128 disposed about conveyor drive shaft 130 and fixedly secured at either end to the inwardly extending portions 132 and 134 of gear boxes 136 and 138 carried at either side of the machine supporting framework. Cross members 140, 142 and 144 interconnect rails 110 and 112; and conveyor guide rails 146 and 148 respectively depend therefrom.

An endless chain delivery conveyor, generally designated 150, is carried upon the above described support assembly and comprises drive shaft 130 suitably journaled at either end in gear boxes 136 and 138 and having fixedly secured at its ends drive sprockets 152 and 154; and an idler shaft 156, journaled in bushings 158 and 160 secured, as by nuts 162, to side rails 110 and 112, to the ends of which shaft are fixed idler sprockets 164 and 166. A pair of endless chains 168 and 170 are respectively entrained about sprockets 152 and 164 and about sprockets 154 and 166, and such chains are provided with a pair of cleats 172 and 174 extending between and at right angles to the chains, said cleats being secured thereto for engaging the rearward ends of the rearmost pair of the six pack beer cartons 176 positioned upon the rocker plate 56 when said plate is pivoted out of the plane of the skid plate 40 into the inclined pickup position of Figure 2. Adjusting nuts 116 permit positional adjustment of the delivery conveyor through the raising or lowering of conveyor support rails 110 and 112. Guidance for the lower reaches of the chains 168 and 170 is provided by the guide rails 146 and 148, the lower edges of which give such reaches a biangular inclination. Adjusting nuts 178 are provided for positionally adjusting the shaft 156 and the sprockets 164 and 166 to properly tension or take up slack in the conveyor chains 168 and 170.

Conveyor shaft 130 is suitably journaled at either end interiorly of gear boxes 136 and 138 and is driven to effect rotation of the delivery conveyor by a pair of vertical shafts 180 journaled at their upper ends in each of said gear boxes and driving through miter gears (not shown) secured at the upper ends thereof and disposed within said gear boxes to drivingly engage similarly disposed miter gears (not shown) secured at either end of shaft 130.

A transport conveyor, generally designated 182, is symmetrically disposed relative to the longitudinal axis of skid plate 40 extending therebeneath at its rearward end. Conveyor 182 comprises a drive shaft 184 suitably journaled at either end in gear boxes 186, to which shaft are fixedly secured drive sprockets 188 and 190, and suitably journaled idler shaft 106 to which are secured idler sprockets 192 and 194 and the aforementioned driving sprocket 104 for effecting rotation of cams 74 and 94. A pair of endless chains 198 and 200 are respectively entrained about sprockets 188 and 192 and sprockets 190 and 194, having secured thereto lug links 202 which project outwardly therefrom to act as loaded-tray pushers as hereinafter explained. Adjusting nuts 204 threaded on a pair of spaced apart tension rods 206, which extend through either end of cross member 20, serve to positionally adjust idler shaft 106 and sprockets 192 and 194 for the proper tensioning or take-up of slack in the transport conveyor chains 198 and 200.

Shaft 184 is driven to effect rotation of the transport conveyor 182 by pairs of sprockets 208 and 210 fixed thereto, which are in turn driven by chains 212 and 214 of the forming conveyor 216 entrained thereabout, the driving means for said forming conveyor chains not being shown, but comprising any suitable power source, preferably an electric motor, controlled as hereinafter described. Secured at either end of the shaft 184 are miter gears (not shown) disposed within the gear boxes 186—186 which are in mesh with similar gears secured intermediate the ends of the pairs of upright shafts 180, the latter being journaled at their lower ends in the gear boxes 186—186. Through such positive mechanical linkage the operation of the delivery conveyor 150 is synchronized with the operation of the transport conveyor 182, the forming conveyor 216, and also with the operation of the rocker plates 56 and the stop members 82, which latter are responsive, as heretofore mentioned, through pitmans 64 and 68, to rotation of cams 74 and 94 driven in rotation by sprocket 104 secured to the transport conveyor shaft 106.

Also synchronized with the operation of the above elements through a positive mechanical linkage is the tray blank feed means, generally designated 218, which is laterally displaced from the delivery conveyor 150 for the purpose of delivering tray blanks thereto. The tray blank feed means 218 is of conventional design. Such feed means is carried upon a supporting framework, including cross members 22 and 24, which laterally project to one side of delivery conveyor 150, transverse members 220, 222 and 224, and upstanding members 226 at either side of the framework.

A carton feed magazine 228 is carried upon said supporting framework being defined by trapezoidal side members 230 between which is secured a horizontal rail 232, an upright one-tray blank limit bar 234 secured centrally of rail 232, upright rods 236 and 238, and an obliquely disposed rearward member 240. Tray blanks are positioned in a stack 242 in magazine 228 to be fed singly from the bottom of such stack by the tray blank feed conveyor 244 which comprises drive sprockets 246 and 248 fixedly secured to drive shaft 250 journaled at either end in bearing blocks 252; idler sprockets 254 and 256 carried upon a similarly journaled shaft 258; and endless chains 260 and 262 entrained about said sprockets. Lugs 264 are pivoted at similar positions to the chains 260 and 262 for coaction in tray blank feed and are respectively biased by springs 266 to project outwardly of said chains for tray blank pick-up. A horizontal plate 268 is supported upon members 22 and 24 and carries at either side support rails 270 which underlie and prevent sag in the upper reaches of endless chains 260 and 262. Also carried atop plate 268 is a tray support roller block 272, positioned adjacent upright member 234, and a biangular guide member 274 positioned at the forward end of the plate. For initial tray blank pick-up, the feed means 218 is provided with cams 276 fixedly secured at either end of shaft 258 outwardly of the idler sprockets 254 and 256, and each carrying single blank pick-up fingers 278. As indicated above, operation of the tray blank feed means 218 is synchronized with the other enumerated elements of the machine, being provided for through a positive chain and gear linkage including sprocket 280 secured to drive shaft 250, sprocket 282 secured to shaft 284, driven from gear box 136, and an endless chain 286 entrained about said sprockets.

Forming and sealing of the tray blank about the articles prepositioned thereon, herein illustrated as loaded six pack cartons of beer 176, is accomplished, in part, by forming conveyor 216 to which the loaded trays are fed by transport conveyor 182. The forming conveyor 216 is aligned with conveyor 182 and, as described above, its trailing end idler sprockets 208 and 210 are secured to shaft 184 astraddle the lead end sprockets 152 and 154 of conveyor 182. The endless chains 212 and 214 entrained about sprockets 208 and 210 carry a plurality of transverse spaced apart support bars 288, arranged in sets of threes, throughout the length of the chains, each set being disposed between a front flap folding plate 290 and a rear flap folding plate 292, likewise carried by chains 212 and 214 and extending therebetween. As illustrated in Figure 8, each front flap folding plate assembly includes a supporting shaft 294 journaled for rotation at either end in blocks 296 secured to chains 212 and 214, support members 298 fixedly secured at either end of shaft 294, and a contact bar 300 carried at the outer ends of the support members 298. Pivotal movement of plate 290 is effected through tie rods 302, at one end pivoted as at 304 to the inner ends of support members 298 and at the other end fixedly secured through rods 306 to cross rod 308, the latter carried for rotation at either end by chains 212 and 214.

Means are provided adjacent the forming conveyor 216 to cooperate therewith in the forming and gluing of the tray blanks and include a pair of parallel horizontal plow elements 310, Figures 1 and 10, with flared rearward ends 312, disposed astraddle the conveyor 216 near its rearward end; a pair of arcuate tuck arms 314, each fixedly secured to shafts 180 for rotation therewith; a pair of glue applicators 316 disposed outwardly of and immediately adjacent to the horizontal plow elements 310 and described in detail hereinafter; and inclined toed-in plow elements 318, Figures 1 and 11, astraddle conveyor 216 forwardly of elements 310. A compression conveyor 320, aligned with conveyor 216 and including presser rollers 322, about which latter are entrained endless upstanding belts, is disposed immediately forward of plow elements 318 for facilitating the permanent setup of glue applied to the tray blank side panels.

In Figure 3, a typical glue application 316 is shown as comprising a body 324 pivotally mounted, as at 326, to framework side member 14 and having a rectangular recess 328 for the reception of glue. There are rotatably carried by the side walls of body 324 a pick-up roller 330, extending within recess 328 to a point closely adjacent its bottom, a transfer roller 332 tangentially contiguous with the pick-up roller 330, and an applicator or driving roller 334 tangentially contiguous with transfer roller 332, the latter operable when pivoted into engagement with an underlying tray blank side panel, to drive rollers 332 and 330 in rotation for glue pick-up and application. Pivotal movement of body 324 is effected through a pitman 336 pivoted at its upper end to body 324, as at 338, and at its lower end provided with an elliptical collar 340 slidably disposed about shaft 96 and carrying at its lower extremity a roller or cam follower 342, disposed for engagement by the projecting lobe of cam 344, the latter fixedly secured for rotation with shaft 96. It should be noted that the operation of the glue applicators 316 and the tuck arms 314 is positively synchronized with operation of the other element of the machine as discussed above, being responsive to rotation of conveyor 216 which serves as the single convenient power-transmitting means for the entire machine, being operatively connected by means (not shown) to motor M1, Figure 12. By positive interconnection of the machine elements, proper operating synchronization is assured irrespective of the speed of rotation of conveyor 216. Such arrangement further permits simplified centralization of the control means and of safety provisions included therein, as described below.

In Figure 12 is shown the electrical circuitry for the control system in which the various switches are illustrated in their normal positions, unless otherwise indicated. For purposes of illustration the condition of Figure 2 is assumed, i.e., four loaded six pack cartons 176 are positioned two abreast upon rocker plate 56 with similar filled cartons 346 being positioned therebehind for feeding in two lines from skid plate 40 onto plates 56, as hereinafter described. Rocker plates 56 are pivoted by pitmans 64, elevating cartons 176 into positions for pick-up by the delivery conveyor 150, through engagement of the rear edges of the rearward pair of cartons by the cleat 172. The rocker plates 56, when thus pivoted, also serve as segregating means, effecting stoppage of the cartons 346 fed in two lines onto the skid plate 40 from conveyor 41 and lined up behind cartons 176.

Pitmans 64 are maintained in an upwardly extended position by lever arms 70 as the latter are pivoted upwardly about shaft 76 by rollers 72 tracking upon the extended projecting lobes of cams 74. The stop members 82 have been pivoted to depress their toe flanges 84 below the surface of skid plate 40 and out of engagement with the lower forward edges of the front pair of cartons 176, thus releasing the four cartons 176 from restraint against forward movement. Like plate 56, operation of members 82 is effected through pitmans positioned for response to cam actuated levers. Thus pitmans 86 move downwardly in response to actuation by lever arms 90 and their rollers 92 as the latter track upon the extended projecting lobes of cams 94, causing the said lever arms to pivot downwardly about shaft 76.

Referring now to the control circuit diagram of Figure 12 in which the power supply lines are designated L1 and L2, with the lines of incoming cartons 346 filling positions upon skid plate 40 behind up-tilted plates 56, the normally open contacts of limit switches LS1 and LS2, Figure 12, are respectively actuated by each filled line to reverse their positions causing closure of the normally open contacts of the time delay relay TDR1 by energizing its coil through conductor 400. Should either or both of such in-feed lines be empty of cartons, limit switch LS1 and/or LS2 will remain in their normal positions thereby energizing pilot light 402 through conductor 404 to indicate such condition.

Time delay relay TDR2, series connected with the various control and indicating circuits, is maintained with its contacts normally closed by a coil energized through a circuit including photocell PC1 and conductor 406. Photocell PC1 is positioned with its beam traversing the path travelled by the completed trays after discharge from presser conveyor 320. Breaking of the beam for a period greater than that ordinarily required for loaded tray passage, will effect the timing out of time delay relay TDR2 and the opening of its contacts to stop machine operation, thus preventing backing up of the completed trays into the forming and gluing areas.

The limit switch LS3 is caused to reverse its normal position when a carton blank 348 is positioned upon table 350, Figure 6. As will become apparent from the description which follows, an additional cam actuated limit switch LS4, by-passing limit switch LS3, is necessary for the maintenance of an energizing circuit for motor M1 during the period after the tray blank has been carried forwardly by the transport conveyor 182 and before the feeding of another tray blank onto table 350. As shown, limit switch LS4 is in the cammed by-passing position, completing the energizing circuit for motor M1 through conductor 408. If at such time as limit switch LS4 is in a reversed or uncammed position, no tray is properly positioned upon table 350, limit switch LS4 will prevent energization of the motor M1 and will form with LS3, in its normal open position, an energizing circuit through conductor 410 for the no tray blank indicator light 412, indicating the absence of such tray blank.

It is of course important that the six pack cartons be properly positioned upright upon the tray blanks. Normally closed limit switches LS5 and LS6 are respectively actuated by tipped six pack cartons in either of the lines to the machine, thereby performing a safety function in preventing machine operation by breaking the energizing circuit for motor M1 should six pack cartons in tipped attitude be fed to the machine. A pilot light 414 is energized through conductor 416 by either of the limit switches to indicate such improper positioning of one or more of the six pack cartons.

Machine operation is initiated by turning switches S1 and S2 to "run" and manually closing conveyor run switch CR, energization of motor M1, of course, being contingent upon proper positioning of the various relays and switches as described above. Should jog operation be desired, the switch S2 is turned to the "jog" position instead of "run" and stop-jog switch 418 is utilized to effect motor operation through a circuit including conductor 420, which by-passes limit switches LS3, LS4, LS5 and LS6, permitting clearance of the machine irrespective of the positions of such switches.

With energization of motor M1, the various elements of the machine are synchronously driven in the directions indicated in Figure 2. The upper reaches of chains 212 and 214 of forming conveyor 216 move from left to right, driving sprockets 208 and 210 in clockwise rotation and in turn effecting clockwise rotation of shaft 184 and sprockets 152 and 154 of transport conveyor 182. Driven in a like direction, transport conveyor 182 effects the clockwise rotation of sprocket 104 which, through chain 108, causes clockwise rotation of the sprocket 102, shaft 96 and the cams 74, 94 and 344 secured to shaft 96. At the same time, vertical shafts 180 are driven in opposite directions of rotation by shaft 130 through gear boxes 186, and such shafts in turn drive the delivery conveyor 150 through gear boxes 134 and 136, shaft 130 and sprockets 152 and 154 causing the lower reaches of chains 168 and 170 and the cleats 172 and 174, moving thereon, to travel from left to right above the skid plate 40. Shaft 130 further effects the rotation of the tray blank feed conveyor 218 causing the upper reaches of its endless chains 260 and 262 to move from left to right or laterally in the direction of the skid plate 40 and the underlying table 350, driving of the conveyor 218 through its sprockets 246 and 248, being affected through gear box 136, shaft 284, sprockets 280 and 282, and chain 286 entrained about sprockets 280 and 282. With the entire operation of the machine dependent upon motor M1, acting through forming conveyor 216, complete machine shutdown is easily effected by de-energizing such motor. Thus, should the machine for any reason become jammed, a safety clutch limit switch LS7 is provided to immediately effect the de-energization of motor M1 and machine shutdown, limit switch LS7 in such case, being actuated to reverse its normal position in breaking the energizing circuit of motor M1 while at the same time energizing the clutch pilot light 422 through conductor 424. Because each of the operating elements of the machine is positively linked to the others for synchronized operation, there is no problem of maintaining proper synchronism in cases of stoppages or speed variations of motor M1. The importance of properly synchronizing the operation of the various elements of the machine will be appreciated from the description of operation which follows.

As delivery conveyor 150 is driven in rotation, cleat 172 thereon moves into the position of Figure 2 for engagement with the rear upper edges of the rear pair of cartons 176, the latter elevated into the path of travel of cleat 172 by pivoted plates 56 and released from forward restraint by prior downward pivoting of the stop members 82 and their carton-engaging toe flanges. Upon engagement with cleat 172, the cartons 176 are pushed forwardly down the inclined skid plate 40, being guided at either side by side rails 352 carried by members 354 depending from side rails 110 and 112 of the machine supporting framework. As the six pack cartons 176 are pushed forwardly by cleat 172 into the position of Figure 4, a tray blank 348 is positioned thereunder by the tray blank feed means 218.

In Figure 1 is shown a typical tray blank 348, slotted at its sides and scored along the broken lines to facilitate its subsequent forming and gluing, the tray blank being made up of a central panel 356, front and rear panels 358 and 360, and side panels 362 and 364, the front and rear panels respectively including pairs of wing flaps 370 and 372.

With the upper reach of the tray blank feed conveyor 244 being driven from left to right as viewed in Figure 6, the tray blanks such as 348 are individually displaced from the bottom of the stack 242, positioned in magazine 228, and carried by said conveyor for ultimate projection into a position atop table 350. Initial pickup of the individual tray blanks is effected through the fingers 278 on cams 276 which engage the rear edge of the blank, projecting it laterally beneath the limit bar 234, the underside of the blank receiving initial low friction support from roller block 272, which latter also provides the forward support for the tray blank stack 242. With continued rotation of cams 276 and the pickup fingers 278, the rear edge of the tray blank moves downwardly into the path of travel of the pickup cleats 264 of conveyor 244 to be pushed thereby onto table 350. Guide member 274 serves to direct the leading edge or nose of the blank onto plate 350, the latter being provided with a bevelled edge to facilitate such tray blank placement. An eccentric member 374, pivotally carried by framework member 16, prevents a kickback of the blank as it is projected thereunder and against the inner face of member 16.

Positioned as in Figure 4 upon table 350 and symmetrically disposed with respect to transport conveyor 182, the blank 348 is ready for pickup by conveyor cleats 202, which latter engage the rear edge of said blank moving it forwardly from beneath skid plate 40 for receipt of six pack cartons 176 and into the position of Figure 5. At the same time the two pairs of six pack cartons 176, pushed by delivery conveyor cleat 172 and maintained in alignment with underlying blank 348 by rails 352, are deposited upon central panel 356 of the blank.

The forming and gluing operation thereafter performed upon the loaded tray blank 348 while travelling upon conveyor 216 may be briefly summarized as including the steps of folding the front panel 358 into a vertical position, wiping its wing flaps 370 backwardly against the sides of the forward pair of six pack cartons 176, folding the rear panel 360 into a vertical position, wiping its wing flaps 372 forwardly against the sides of the forward pair of cartons 176, applying glue to the front and rear portions of the upper faces of each of the side panels and finally folding said side panels into vertical positions against the folded wing flaps 370 and 372.

In Figure 13, is shown the sequence of operations of the front panel folding plate 290 in effecting the folding of the tray front panel 358 into a vertical position. Similar letters in such figure indicate corresponding positions of the front panel 358 and the front panel folding plate 290 during the folding operation, the primed letters designating the positions of the panel folding plate 290. At position A' the upper edge of the contact bar 300 of panel folding plate 290 has just engaged the underside of front panel 358 causing the front panel to pivot upwardly in a counterclockwise direction about its scored bounding edge. The front panel engaging or rear face of plate 290 at position A' is substantially vertical and remains substantially so as the plate is carried upwardly by the conveyor to complete the front panel folding operation, with maintenance of such vertical attitude being effected by pivoting plate 290 through operation of tie rods 302, end-secured to the rotatable cross member 308. As plate 290 moves upwardly through positions B' and C', tray front panel 358 is moved by transport conveyor 150 forwardly to corresponding positions B and C being progressively up-folded with the upward movement of plate 290 until said panel is in the vertical position at C. As tray 348 moves onto conveyor 216 to assume a position thereon, as at B, it is supported by transverse bars 288 with plate 290, its rear face upright and in abutment with the front panel 358, maintaining said panel in a vertical position.

The operation of the rear panel folding plate 292 is shown in Figure 14, with letter designations primed, as in Figure 13, to indicate corresponding positions for the blank 348 and said panel folding plate. Unlike plate 290, rear panel folding plate 292 is fixedly secured against pivotal movement relative to chains 212 and 214 of conveyor 216 and moves upwardly therewith contacting the underside of rear panel 360 at position A', moving through position B', thereby progressively folding such panel in a clockwise direction about its scored bounding edge into the vertical position of C' and, like plate 290, thereafter serving to maintain the panel in its folded vertical position, as at D. The position of the partially folded tray in Figure 8 corresponds with position D of the up-folded rear panel.

With the front and rear panels 358 and 360 vertically positioned, as in Figure 8, the wing flaps 370 and 372 are ready for folding against the sides of the six pack cartons 176 into the positions illustrated in Figure 9. Rearward folding of wing flaps 370 is effected by plow elements 310 and is initiated as the flaps move into engagement with the flared plow element ends 312. Members 310 also perform a holding function in maintaining wing flaps 370 and 372 in their folded positions, Figure 10. Folding of wing flaps 372 of rear panel 360 is accomplished after the folding of wing flaps 370 by tuck arms 314 rotating with vertical shafts 180 in opposite directions to sweep forwardly into engagement with wing flaps 372, wiping them against the sides of the rearward pair of cartons 176 and thereafter rotating out of engagement with said flaps, the folded condition of the wing flaps being thereafter maintained, as above indicated, by member 310.

The tray is permanently secured in folded condition by the application of quick-setting glue to forward and rearward portions 376 and 378 of the upper faces of side panels 362 and 364, the application of glue being thus limited to those areas of the side panels contiguous with the wing flaps 370 and 372 when the side panels are subsequently upfolded, as in Figure 11, by plow elements 318. The glue is applied by means of applicator rollers 334, a typical one of which is shown in phantom in Figure 10, driven in rotation by contact with the upper surface of the side panel moving thereunder. Since the glue applicators 316 are similar in their construction and operation, the operational description of one, as set forth below, will suffice for both. Typical applicator roller 334 is supplied with glue via contiguous rollers 330 and 332 which rotate in response to the rotation of said applicator roller, pick-up roller 330 carrying the glue from receptacle 328 for deposition upon transfer roller 332, the latter then feeding the glue onto applicator roller 334. Limitation of glue application to the desired areas 376 and 378 is accomplished through pitman 336 which effects the pivoting of glue applicator 316 in a clockwise direction, Figure 3, lifting roller 334 out of contact with the tray side panel, by-passing the central portion thereof. Actuation of the pitman itself is effected through rotating cam 344 which, through its projecting lobe engages roller 342 causing said pitman to move downwardly to the left, being guided in its movement by sleeve 340, disposed about shaft 96.

It is important when shutting down the machine that the applicator rollers 334 be automatically lifted out of engagement with the tray side panels to prevent adherence of such panels to the rollers upon glue set-up. Accordingly, there is provided a limit switch LS8 which permits motor M1 to drive tray 348 forwardly into a non-engaging position by providing a by-passing motor energizing circuit through conductor 426 when any of the above enumerated limit switches, except anti-jamming limit switch LS7, is actuated to otherwise break the energizing circuit to motor M1.

As indicated above, with completion of the application of glue to the side panels 362 and 364, said panels move into engagement with the plow elements 318 as the tray is carried forwardly upon conveyor 216. Elements 318 progressively effect up-folding of the side panels, portions 376 and 378 thereof, respectively abutting wing flaps 370 and 372 to adhesively secure the side panels in vertical positions.

With final forming of tray 348 through the up-folding of its side panels, the tray is carried by conveyor 216 between the vertically disposed belts of compression conveyor 320 where sidewise pressure exerted upon the tray through action of rollers 322 assures effective adhesion between the side panels and the wing flaps of the tray. As previously described, time delay relay TDR2 will automatically effect machine shutdown by de-energizing motor M1 in the event of extended breakage of the beam of photocell PC1 by backup of completed trays into the compressor conveyor area.

Successive groups of four six pack cartons are handled in a manner similar to that described above, being urged forwardly in two lines by conveyor 41, as in Figure 5, onto plate 40. The two leading pairs of cartons 346 move onto rocker plates 56, positioned by pitmans 64 in the plane of plate 40, and are arrested in their forward movement by toe flanges 84 of stop members 82 pivoted upwardly through the action of pitman 86 to project said toe flanges above the upper surface 62 of skid plate 40 and into the path of travel of said cartons. It is of course necessary that the cams 94 be arranged to effect the upward movement of toe flanges 84 before the leading pair of incoming cartons 346 assumes a position thereabove since the toe flanges 84 coact with the rocker plates 56 to segregate the incoming six pack cartons, limiting the number of such cartons atop the plate 56 at any one time to four. Such arrangement permits a clean breakaway of the trailing pair of six pack cartons 346 when rocked upwardly by plates 56 into position for delivery conveyor pick-up, i.e., into a position similar to that assumed by cartons 176 in Figure 2. A substantial space is thus provided between the rear upper edges of the trailing pair of elevated cartons 346 and the front upper edges of the leading pairs of cartons 380, permitting clearance for travel of the cleat 174 above the latter cartons when moving into engagement with the rear pair of elevated six pack cartons 346. As above described, plates 56 are cam actuated through pitmans 64 to assume the position shown in dotted outline in Figure 2 after cam actuation of stop members 82 into carton arresting positions. Pivoting of plates 56 thereby not only effects the above indicated segregation of the six pack cartons 346 for loading upon a particular tray, but also elevates said cartons into appropriate pick-up positions for engagement by the forward traveling cleat 174 of the delivery conveyor 150.

Although the above described embodiment of the invention is adapted for the traying of six pack cartons of beer in units of four, it should be understood that the invention is not limited thereto. Thus it may easily be modified to automatically pack into trays in quantities of one or more articles fed to the machine singly, or in multiples, from one or more supply lines. Such articles are preferably of a generally rectangular contour, but this is obviously not essential; and with minor modifications, the machine can in fact handle a wide variety of article shapes. The above embodiment, however, has been found particularly suitable in the traying of six pack cartons of beer where continuous reliable high speed traying of the cartons is desirable. It will be further understood that the above described embodiment of this invention may be additionally altered, changed or modified without departing from the scope of the invention as hereinafter claimed.

What is claimed is:

1. A tray packing and forming machine comprising, in combination, a skid plate downwardly inclined in a forward direction for supporting one or more articles to be trayed and having a front aperture and a rear aperture, a rocker plate disposed in the rear aperture adapted to be pivoted into the plane of the skid plate to receive said articles and to be pivoted out of said plate to elevate said articles into a pick-up position, a stop member having an upwardly extending toe flange at its forward end adapted for pivoting to project said toe flange upwardly through said front aperture into the path of travel of said articles to arrest their forward movement upon the rocker plate, a delivery conveyor disposed above the skid plate having a cleat for engaging and pushing said articles forwardly from the rocker plate when elevated thereby into a pick-up position, means for feeding a tray blank, slotted and scored for forming, from a magazine laterally displaced to one side of the skid plate to a position therebeneath, means for thereafter transporting the tray blank from beneath the skid plate forwardly to a position for deposition of said articles centrally of the tray blank by the delivery conveyor, and means for thereupon forming and gluing the tray blank.

2. The combination of claim 1, wherein the tray blank comprises a central panel upon which said trayed articles are disposed, front and rear panels, and a pair of opposed side panels, said front and rear panels each being provided at either end with wing flaps, and wherein said forming and gluing means includes a forming conveyor upon which is carried a front panel folding plate for first folding said tray front panel into a substantially vertical position, a rear panel folding plate for thereafter folding said tray rear panel into a vertical position, plow elements for wiping the wing flaps of the front panel rearwardly against the sides of the contents of the tray blank, rotating tuck arms for wiping the wing flaps of the rear panel forwardly against the sides of the tray blank contents, glue applying means disposed at either side of the forming conveyor for thereafter applying glue to front and rear portions only of the upper surfaces of the side panels, and plow elements for completing formation of the tray about its contents by up-folding the side panels into vertical position, the glued surface portions thereby brought into abutment with the wing flaps serving to permanently secure the tray in formed condition.

3. The combination of claim 2, wherein the front panel folding plate is pivoted to the forming conveyor, being maintained by tie rod means substantially vertical as the plate engages the underside of the tray front panel to effect its up-folding, said tie rod means being pivotally connected at one end to the plate and fixedly secured at the other end to a cross bar carried for rotation by the conveyor.

4. A packing machine adapted to load one or more articles upon a tray blank and thereafter fold and glue said blank about said loaded articles comprising, in combination, means for first segregating said articles into a predetermined quantity for traying, including a skid plate having a front and rear aperture in which are respectively disposed for pivotal movement a rocker plate for receiving, segregating, and elevating said quantity of articles into a pick-up position, and a stop member for arresting said quantity of articles against forward movement, means for actuating the rocker plate and the stop member, means for feeding an individual tray blank into a loading position below the skid plate, delivery conveyor means disposed above the skid plate for engaging and pushing said quantity of articles, when elevated for pick-up by the rocker plate and released from restraint by the stop means, forwardly of the skid plate and onto the tray blank positioned therebelow such that said quantity of articles occupies a central position upon the blank, and means for thereafter forming and gluing the tray about said centrally positioned articles.

5. The combination of claim 4, wherein the actuating means for the rocker plate and the stop member includes individual cam and pitman linkages for respectively actuating said rocker plate and stop member.

6. The combination of claim 4, wherein the tray blank feed means includes a transport conveyor positioned below the skid plate and symmetrically disposed relative to its longitudinal axis and a tray blank feed conveyor positioned to one side of the transport conveyor for feeding an individual tray blank thereto for subsequent movement forwardly into said loading position.

7. The combination of claim 6, wherein the tray forming and gluing means includes a forming conveyor in alignment with the transport conveyor for receiving a loaded tray blank therefrom to effect the upfolding of the front and rear panels of said blank and thereafter carry said blank in such partially folded condition into position for completion of its forming and gluing.

8. The combination of claim 7, wherein the forming conveyor of the tray forming and gluing means includes a pair of parallel spaced apart endless chains upon which are carried a front panel folding plate and a rear panel folding plate spaced apart to permit disposition therebetween of a loaded tray blank after the upfolding of its front and rear panels by said plates, said front panel folding plate being pivoted to said forming conveyor and maintained in a substantially vertical position as it is driven into engagement with the underside of the front panel to effect its progressive upfolding, and said rear flap folding plate being fixedly secured to said forming conveyor to thereafter engage the underside of the rear panel to effect its upfolding.

9. A packing machine adapted to load one or more articles upon a tray blank and thereafter fold and glue said blank about said loaded articles comprising, in combination, means for first segregating said articles into a predetermined quantity for traying, including a skid plate having a front and a rear aperture in which are respectively disposed for pivotal movement a rocker plate for receiving, segregating and elevating said quantity of articles into a pick-up position, and a stop member for arresting said quantity of articles against forward movement, means for actuating the rocker plate and the stop member, means for feeding an individual tray blank into a loading position below the skid plate, delivery conveyor means disposed above the skid plate for engaging and pushing said quantity of articles, when elevated for pick-up by the rocker plate and released from restraint by the stop means, forwardly of the skid plate and onto the tray blank positioned therebelow such that said quantity of articles occupies a central position upon the blank, and gluing and forming means including a forming conveyor upon which are carried a front panel folding plate and rear panel folding plate for respectively effecting the upfolding of the front and rear panels of a tray blank after loading with said articles, stationary plow elements at either side of the forming conveyor for wiping the outer portions of the upfolded front panel rearwardly into right angle relationship with said front panel, tuck arms disposed to the rear of the stationary plow elements and adjacent the forming conveyor adapted to be driven in rotation to wipe the outer portions of the rear panel forwardly into right angle relationship with said rear panel, glue applicator means disposed at either side of the forming conveyor for applying glue to the front and rear portions only of the upper surfaces of the opposite side panels of the tray blank, and plow elements disposed forwardly of the glue applicator means at either side of the forming conveyor to thereafter fold the tray blank side panels upwardly to cause abutment of their glued portions with the wiped outer portions of the front and rear tray blank panels and to thereby adhesively secure the blank in fully formed condition.

10. The combination of claim 9, wherein the front panel folding plate and the rear panel folding plate are spaced apart to permit cradling therebetween of a loaded tray blank after the upfolding of its front and rear panels by said front and rear panel folding plates respectively, said front panel folding plate being pivoted to the forming conveyor and maintained in a substantially vertical position as it is driven into engagement with the underside of the front panel to effect its progressive upfolding and said rear flap folding plate being fixedly secured to said forming conveyor to thereafter engage the underside of the rear panel to effect its upfolding.

11. The combination of claim 9, wherein the forming conveyor is driven in rotation and operatively connected with the article segregating means and the tray blank feed means, serving as a power transmitting means therefor.

12. The combination of claim 11, wherein the tray blank feed means includes a transport conveyor and wherein the actuating means for the rocker plate and the stop member includes a shaft operatively connected with and driven in rotation by said transport conveyor, said shaft having fixedly secured thereto a pair of cams for respectively actuating the rocker plate and the stop member through pivoted lever arms tracking upon said cams and pitmans respectively pivoted to the rocker plate and stop member responsive to movement of said lever arms.

13. In a tray packing machine, means for segregating and delivering at least one article onto a tray blank comprising, in combination, a skid plate for supporting said article, an elevator plate disposed in an aperture formed in said skid plate adapted for movement into the plane of the skid plate to receive said article and for movement out of said plane to elevate said article into a pick-up position, a stop member disposed in an aperture formed in said skid plate adapted for movement upwardly through the skid plate into the path of travel of said article to arrest its forward movement upon the elevator plate, and a delivery conveyor disposed above the skid plate having a projecting cleat for engaging and pushing said articles forwardly from the elevator plate, when said article is elevated by said elevator plate into pick-up position and released of the restraint of the stop member, onto a tray blank positioned below the skid plate.

14. The combination of claim 13, wherein the elevator plate and the stop member are pivotally mounted and are respectively actuated through individual pitmans pivoted thereto and operatively connected for response to separate cams fixedly secured for rotation to a common shaft.

15. In a tray packing machine, means for segregating and delivering one or more articles centrally of a tray blank comprising, in combination, a skid plate for supporting said articles having a front aperture and a rear aperture, a rocker plate disposed in the rear aperture adapted for pivoting into the plane of the skid plate to receive said articles and for pivoting out of said plane to elevate said articles into a pick-up position, a stop member having an upturned flange adapted for pivoting to project said flange upwardly through the front aperture into the path of travel of the articles to arrest their forward movement upon the rocker plate, means for feeding an individual tray blank into article loading position slightly below the skid plate and with its central panel aligned with the path of forward travel of the articles upon the skid plate, and a delivery conveyor disposed above the skid plate having a projecting cleat for engaging and pushing said articles forwardly from the rocker plate, when elevated by said rocker plate into pick-up position and released of the restraint of the stop member, onto a tray blank positioned below the skid plate by said feed means.

16. The combination of claim 15, wherein the tray blank feed means includes a transport conveyor disposed slightly below the skid plate and in alignment therewith for support and positioning of the tray blank during loading, and a tray blank feed conveyor disposed to one side of the transport conveyor for delivering individual tray blanks thereto.

17. The combination of claim 16, wherein the actuating means for the rocker plate and the stop member includes a shaft operatively connected with and driven in rotation by said transport conveyor, said shaft having fixedly secured thereto a pair of cams for respectively actuating the rocker plate and stop member through pivotally supported cam-engaging lever arms and pitmans pivoted thereto.

18. In a tray packing machine, means for folding the front panel of a tray blank into a vertical position including a conveyor for the receipt of a tray blank having a pair of parallel spaced apart endless chains between which are carried for pivotal movement a front panel folding plate and a cross member spaced therefrom, and means tying the plate to the cross member, said means being fixedly secured at one end to the cross member and at the other end pivotally connected to the front panel folding plate to thereby maintain said plate in a substantially vertical position as the plate engages the underside of the tray blank front panel to effect its upfolding when the tray blank is moved onto the rearward end of the conveyor.

19. The combination of claim 18, wherein the front panel folding plate includes a support member at one end of which is disposed a horizontal contact bar extending transversely of the conveyor and to the other end of which is pivotally connected said tie means, said support member being fixedly secured to a shaft disposed in parallel relationship with said contact bar and supported for rotation by the conveyor.

20. In a tray packing machine, means for forming a tray from a substantially flat blank comprised of a central panel, front and rear panels, and a pair of side panels, said means comprising a forming conveyor, a front panel folding plate carried by said conveyor for folding said blank front panel into a substantially vertical position, a rear panel folding plate carried by said conveyor for folding said blank rear panel into a substantially vertical position, said plates being spaced apart a distance substantially equal to the distance between said front and rear panels when said panels are upfolded; said front panel folding plate being pivotally mounted on said conveyor and being maintained substantially vertical, as said plate engages the underside of said front panel to effect its upfolding, by tie rod means pivotally connected at one end to the plate and pivotally connected at the other end to the conveyor.

21. In a packing machine, means for segregating at least one article from a plurality of such articles comprising, in combination, a skid plate for supporting a plurality of said articles, a conveyor for feeding said articles to said skid plate, said skid plate having an elevatable plate portion mounted for movement from a first position coplanar with said skid plate to a second position thereabove, said elevatable plate portion in said second position serving to block movement of articles past the trailing edge thereof, a stop member mounted for movement from a first position in which it obstructs the movement of articles past said elevatable plate portion to a second position enabling movement of articles past said elevatable plate portion, and means to move said elevatable plate portion and said stop member cyclically together from their respective first positions to their respective second positions and then back to their respective first positions.

References Cited in the file of this patent

UNITED STATES PATENTS

| 1,599,154 | Weightman et al. | Sept. 7, 1926 |
| 1,797,191 | Gordon | Mar. 17, 1931 |
| 2,291,165 | Nordquist | Aug. 4, 1942 |
| 2,362,959 | Stein et al. | Nov. 14, 1944 |
| 2,523,667 | Palmer et al. | Sept. 26, 1950 |
| 2,719,392 | Rowland et al. | Oct. 4, 1955 |